United States Patent
Kim et al.

(10) Patent No.: US 6,804,482 B2
(45) Date of Patent: Oct. 12, 2004

(54) PRINTER TO CONTROL POWER SUPPLY VIA A HOST

(75) Inventors: Jung-hwan Kim, Yongin (KR); Young-bok Ju, Sungnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/254,975

(22) Filed: Sep. 26, 2002

(65) Prior Publication Data
US 2003/0142515 A1 Jul. 31, 2003

(30) Foreign Application Priority Data
Jan. 28, 2002 (KR) .......................................... 2002-4829

(51) Int. Cl.[7] .............................................. G03G 15/00
(52) U.S. Cl. ..................................................... 399/88
(58) Field of Search ........................ 363/16, 20, 21.01, 363/21.04, 21.07; 399/88.9; 347/50, 162; 358/443, 444

(56) References Cited

U.S. PATENT DOCUMENTS

| | | | | |
|---|---|---|---|---|
| 5,550,637 A | * | 8/1996 | Murakami | 358/296 |
| 5,708,821 A | * | 1/1998 | Takikita | 713/310 |
| 6,134,401 A | * | 10/2000 | Yun et al. | 399/70 |
| 6,389,544 B1 | * | 5/2002 | Katagiri | 713/300 |
| 6,459,496 B1 | * | 10/2002 | Okazawa | 358/1.14 |

* cited by examiner

Primary Examiner—Matthew V. Nguyen
(74) Attorney, Agent, or Firm—Staas & Halsey LLP

(57) ABSTRACT

A printer is connected to a host via an interface having a data wire and a power supply wire. The printer includes a power supply portion to convert an external power to a driving power and to supply the driving power to the respective electronic components of the printer, a switch portion to determine whether to supply the driving power to the respective electronic components, and a controller capable of operating from the voltage applied through the power supply wire, to control the switch portion according to a transmission of printing data through the data wire. The controller controls the switch portion to stop a supply of the driving power to the respective electronic components when the printing data is not transmitted for a predetermined time, and when the voltage is not applied through the power supply wire of the interface. Accordingly, unnecessary power consumption is reduced and convenience is improved.

10 Claims, 4 Drawing Sheets

PRINTER TO CONTROL POWER SUPPLY VIA A HOST

CROSS-REFERENCE TO RELATED APPLICATIONS

This application claims the benefit of Korean Application No. 2002-4829, filed Jan. 28, 2002, in the Korean Industrial Property Office, the disclosure of which is incorporated herein by reference.

BACKGROUND OF THE INVENTION

1. Field of the Invention

The present invention relates to a printer, and more particularly, to a printer capable of controlling a power supply via a host.

2. Description of the Related Art

Generally, a printer is usually left in an on-state when the printer is not in use. In the on-state, the printer starts a printing operation upon receipt of a selection command from a user. In the conventional printer, the power is constantly applied to at least a part or to the entire system of the printer, even if the printer is turned off.

Accordingly, power is unnecessarily consumed.

SUMMARY OF THE INVENTION

Accordingly, it is an object of the present invention to provide a printer capable of controlling a power supply via a host.

Additional objects and advantages of the invention will be set forth in part in the description which follows and, in part, will be obvious from the description, or may be learned by practice of the invention.

The above object is accomplished by providing a printer connected to a host via an interface having a data wire through which printing data is transmitted from the host and a power supply wire through which a voltage is applied from the host, the printer comprising a power supply portion for converting an external power to a driving power and supplying the driving power to the respective electronic components of the printer, a switch portion for determining whether to supply the driving power to the respective electronic components, and a controller capable of operating by the voltage applied through the power supply wire, for controlling the switch portion according to a transmission of the printing data through the data wire.

The controller controls the switch portion to stop supplying the driving power to the respective electronic components when the printing data is not transmitted for a predetermined time, when the respective electronic components do not operate for a predetermined time and when the voltage is not applied through the power supply wire.

Accordingly, the power supply to the printer is controlled via the host according to the transmission of the printing data from the host, and a power state of the host.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
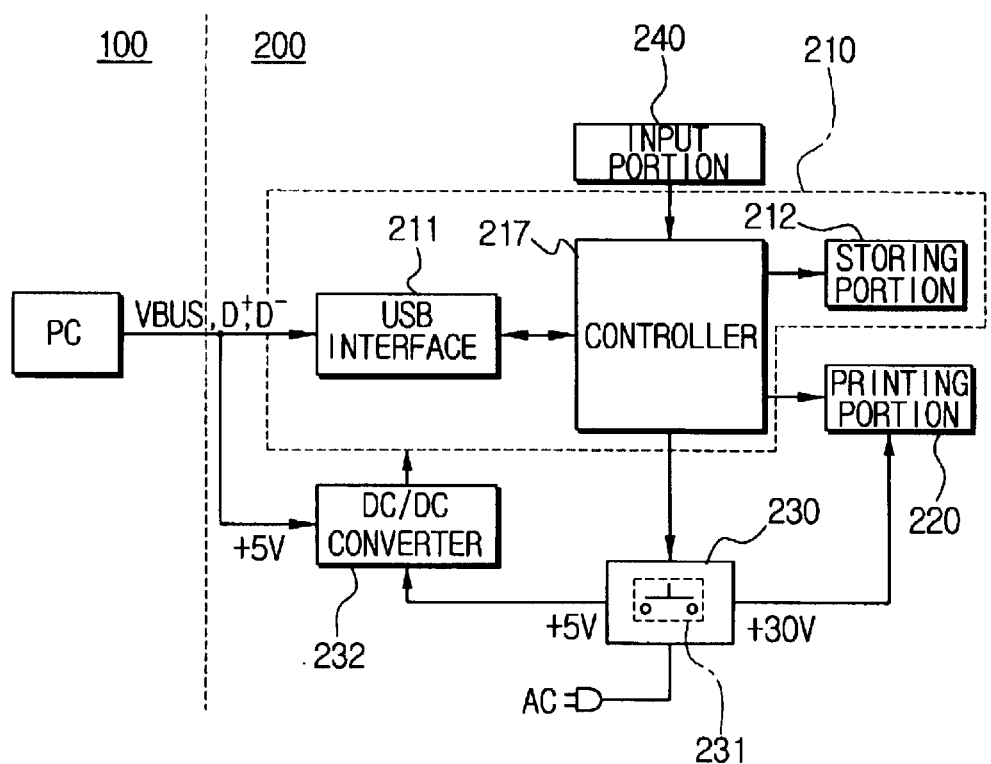
FIG. 1 is a block diagram showing a power supply apparatus of a printer according to an embodiment of the present invention.

Reference will now be made in detail to the present preferred embodiments of the present invention, examples of which are illustrated in the accompanying drawings, wherein like reference numerals refer to like elements throughout.

A described embodiment of the present invention includes a computer as a USB host, and a printer as a USB device of a USB system.

A printer 200 has a logic portion 210 to logically control an operation of the printer 200, a printing portion 220 to perform a printing operation of the printer 200, a power supply portion 230 to supply a power to the printer 200, and an input portion 240 to input a selection command which is made by a user for the printing operation and other operations of the printer 200.

The logic portion 210 generally has a USB interface 211, a storing portion 212, and a controller 217. A logic power to operate the logic portion 210 ranges approximately from +2.5V to +3.3V.

The storing portion 212 has a ROM (not shown) in which a program for operations and controls of the printer 200 is stored, and a RAM (not shown) in which printing data received from a host 100 (such as a Personal Computer) is temporarily stored.

The USB interface 211 has a data wire (D+, D−), through which the printing data is transmitted, and a Voltage Bus (VBUS) to supply a voltage of +5V.

A DC/DC converter 232 converts the voltage of +5V, which is applied from the VBUS and the power supply portion 230, to the logic voltage (+3.3V or +2.5V) to operate the logic portion 210.

Accordingly, even when the power is not supplied to the printer 200, the logic portion 210 of the printer 200 is constantly applied with the logic voltage by the DC/DC converter 232 using the voltage of +5V, which is applied from the VBUS of the USB interface 211 connected to the host 100.

Using a transformer T (see FIG. 2) as a reference, the power supply portion 230 includes a first side to directly receive AC power from an AC power code, and a second side to convert the power of the first side to DC power for the printer.

The first side of the power supply portion 230 is provided with a switch portion 231 to determine the power supplied to the printer 200 in accordance with a control signal from the controller 217.

For example, when the printing data is transmitted from the host 100, the controller 217 recognizes the printing data as a command to supply the power to the printer 200 and accordingly, transmits a control signal to the power supply portion 230 to operate the switch portion 231. On the other hand, when the printer 200 does not receive any printing data or does not operate for a predetermined time after completing a printing operation, the controller 210 recognizes the non-operation as a command to stop power supply to the printer 200 to save power. Accordingly, the controller 217 transmits a control signal to the power supply portion 230 to stop the operation of the switch portion 231.

Also, when the host 100 is switched from a "turn-on" state to a "turn-off" state, the controller 217 of the printer 200 controls the switch portion 231 of the power supply portion 230 to stop the power supply to the printer 200.

Also, when the host 100 is turned off or is disconnected from an interface connector (not shown) in the state that the printer 200 is supplied with the power from the power supply portion 230, i.e., when the printer 200 is in the on-state, the controller 217 treats this situation as if the power is not supplied from the VBUS. Accordingly, the controller controls the switch portion 231 of the power supply portion 230.

The printing portion 220 includes a printing head and a motor (not shown), which perform a main printing operation. A drive power to operate the printing portion 220 is approximately +30V.

The input portion 240 includes a manipulation button (not shown), with which the user inputs a selection command, and a selection switch S/W (see FIG. 2) to select a power on/off state.

That is, the power supply to the printer 200 is controlled in accordance with a transmission of the printing data from the host 100 or is controlled in accordance with a user's selection command by the selection switch S/W provided on the input portion 240. The power supply to the printer 200, which is disconnected from the USB interface 211, is controlled in the same way as the power supply to a general printer.

Figure 2:
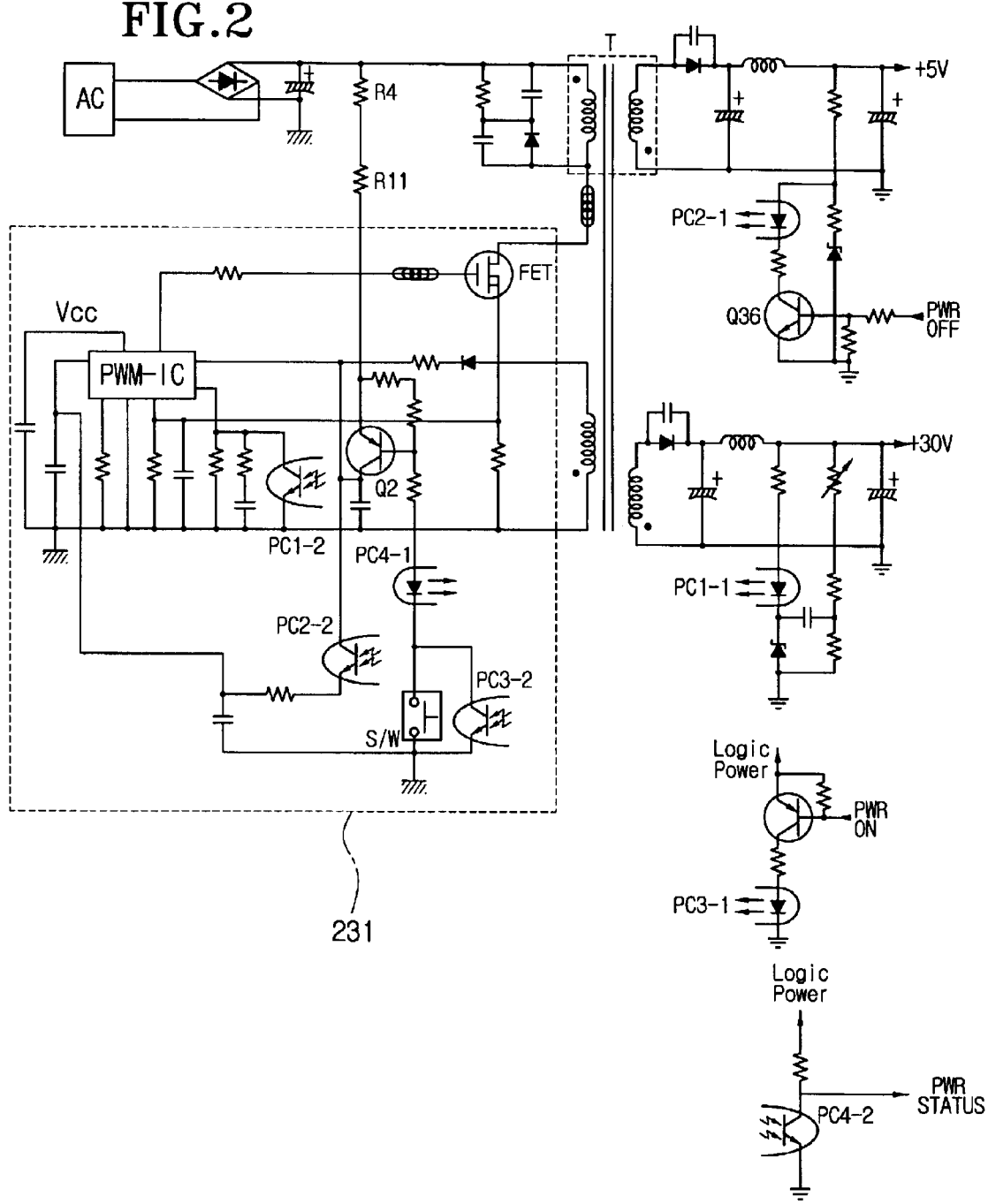
FIG. 2 is a view showing a circuit of a power supply portion of FIG. 1.
Figure 3A:
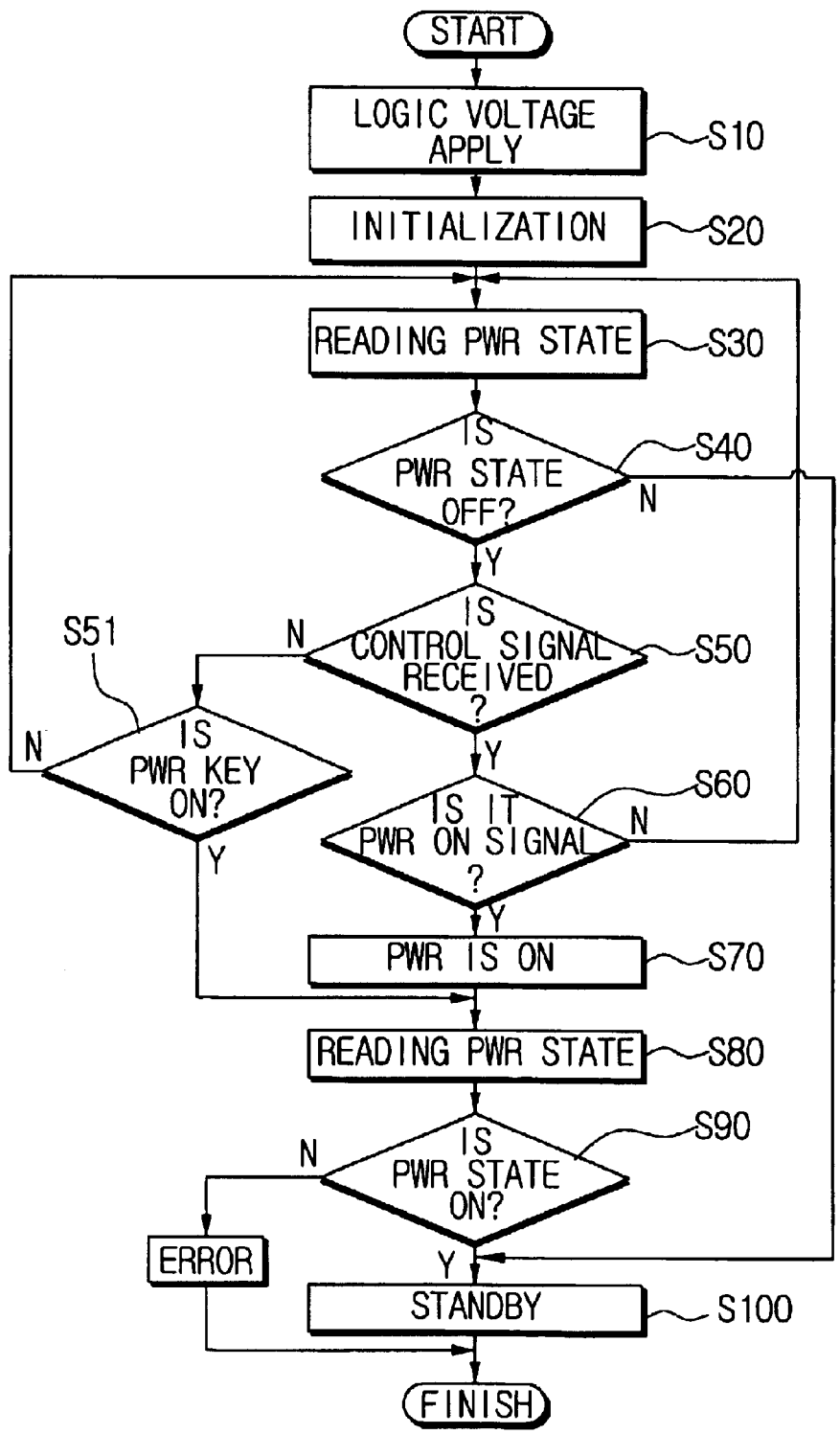
FIGS. 3A and 3B are flow charts showing a power supply control method of the printer of FIG. 1.
Figure 3B:
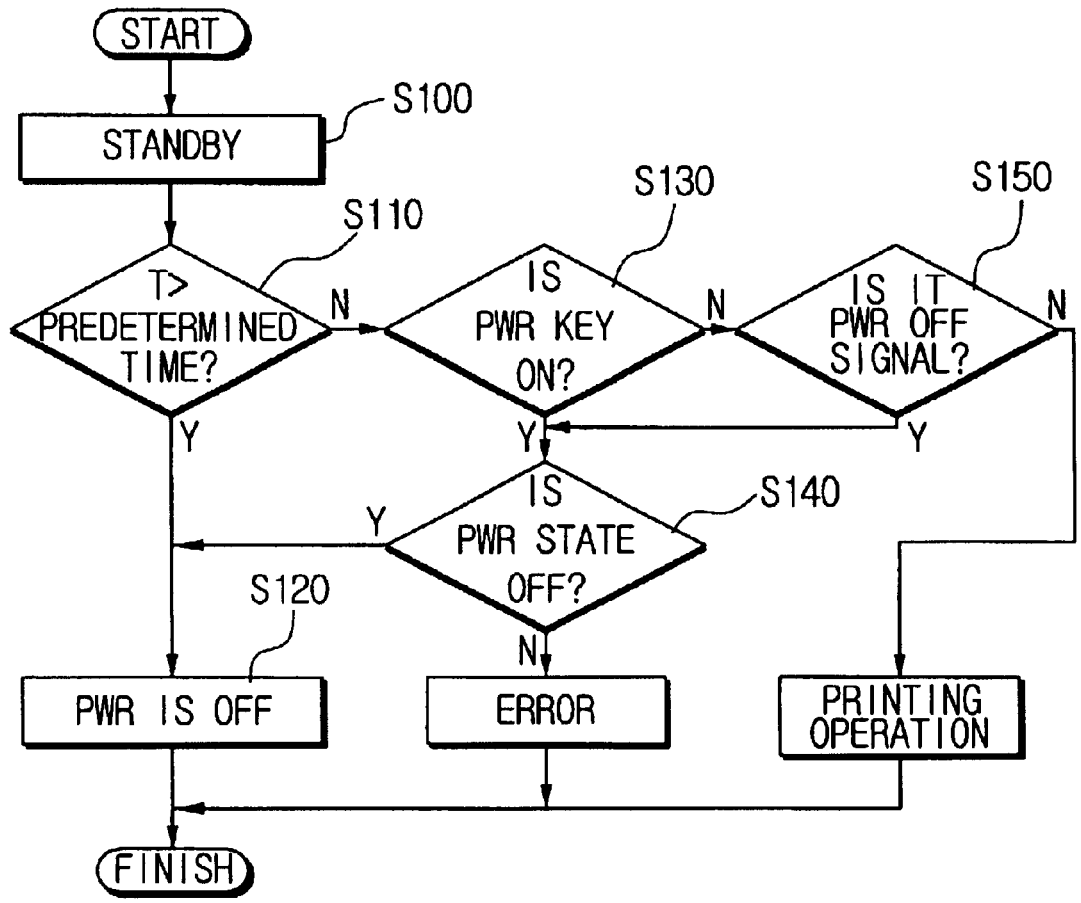

Referring to FIGS. 2, 3A and 3B, a power supply controlling method of the printer 200 using the USB interface 211 will be described. Hereinafter, a power supply wire is referred to as a VBUS line.

As shown in FIG. 2, when the AC voltage is applied to the printer 200 through the AC power code, a DC voltage, which is rectified by a bridge rectifier circuit, is transmitted to the first side of the power supply portion 230. At this point, since an operation voltage (Vcc) is not applied to a Pulse Width Modulation Integrated Circuit (PWM-IC)(231), the printer 200 is not supplied with the power and thus is in the off-state.

Referring to FIG. 3, a process of turning the printer 200 on is described. The voltage of +5V is constantly applied from the VBUS line of the USB interface 211, and is converted to the logic voltage (+3.3V or +2.5V) by the DC/DC converter 232. The logic voltage operates the logic portion 210 (S 10). Accordingly, the logic portion 210 initializes the printer 200 (S 20).

At this point, the controller 217 determines whether the logic voltage to drive the logic portion 210 is applied from the power supply portion 230 or from the VBUS line, and reads the power state of the printer 200 (S 30). For example, the controller 217 reads an output terminal of +5V of the power supply portion 230, or other available ports. If an output voltage from the port is 'HIGH', the controller 217 recognizes the power state of the printer 200 as being in the "power-on" state, and if the output voltage from the port is 'LOW', the controller recognizes the power state of the printer 200 as being in the "power-off" state.

If the printer 200 is in the off-state (S 40), the printer 200 operates in a sleep mode until the printing data, i.e., the "power-on" control signal is transmitted from the host 100.

At this point, when the printing data is transmitted from the host 100 (S 50), the controller 217 transmits the control signal to the power supply portion 230 to operate the printing portion 220 of the printer 200, then the process proceeds to operation S70, discussed below. If, however, the "power-on" signal is not received, then the process returns to S 40. That is, the controller 217 inputs the 'LOW' signal into a terminal (PWR ON) of the second side of the power supply portion 230 (shown in FIG. 2).

When the 'LOW' signal is input into the terminal (PWR ON), a photodiode (PC3-1) inside a photo-coupler (PC3-1, PC3-2) operates to emit the light. By the light emitted from the photodiode (PC3-1), a phototransistor (PC3-2) inside the photo-coupler (PC3-1, PC3-2) operates such that a base voltage of a transistor Q2 becomes 'LOW'. Therefore, according to a characteristic of a PNP type transistor, the state between a collector and an emitter becomes closed, such that the DC voltage is applied to operate a PWM-IC (231).

A field effect transistor (FET) is switched by the operation of the PWM-IC (231) to induce the voltage of the first side to the second side. Accordingly, the power supply portion 230 supplies the logic portion 210 and the printing portion 220 of the printer 200 with their respective drive voltages +5V and +30V (S70). The voltage of +5V is supplied to the logic portion 210 after being converted to a logic voltage by the DC/DC converter 232, and the voltage +30 is directly supplied to the printing portion 220. At this point, the controller 217 reads the output terminal(+5V or +30V) or other available ports (S 80), and then recognizes the power state of the printer 200 as being in the "power-on" state (S 90).

Meanwhile, when the user inputs a selection command using the selection switch (S/W), i.e., when the selection switch is pressed (S 51), the transistor Q2 of the power supply portion 230 is turned on, such that the PWM-IC(231) operates normally, and the printer 200 is applied with the power (S 80).

At this time, a photo coupler (PC4-1, PC4-2) is operated, and the controller 217 recognizes the power state of the printer 200 by checking an output voltage of the phototransistor (PC4-2) in a polling method. That is, if the output voltage of the phototransistor (PC 4-2) is 'LOW' (S80), the controller 217 recognizes the power state of the printer 200 as being "power-on" (S90).

Next, the printer 200 is supplied with the power from the power supply portion 230 and is placed on standby for the printing operation (S 100), and performs the printing operation based on the printing data transmitted from the host 100.

Next, referring to FIGS. 2 and 3B, a process of turning the printer 200 off is described. After completing the printing operation as described above, if the printer 200 is continuously kept in a standby mode (S 100) for a predetermined time (S 110), i.e., if the printing data and the control signal are not transmitted for a predetermined time, the controller 217 transmits the control signal to the terminal (PWR OFF) of the second side, as shown in FIG. 2, to stop the power supply to the power supply portion 230.

That is, if a 'HIGH' signal is input into the terminal (PWR OFF), the 'HIGH' signal is supplied to the base of the transistor Q36 such that the collector and the emitter close. By the operation of the photo-coupler (PC2-1 and PC2-2), the operation voltage (Vcc) of the PWM-IC(231) is bypassed to the PWM enable terminal and is stopped. Switching of the FET is stopped such that the voltage applied to the second side is stopped. Accordingly, the printer 200 is not applied with power (S 120).

Also, if the selection switch (S/W) is pressed within a predetermined time to stop the power (S 130), the controller 217 confirms that the selection switch (S/W) is pressed, and then transmits the control signal to the terminal (PWR OFF) of the second side of the power supply portion 230 to stop the power supply to the printer 200. At this point, the controller 217 determines the power supply state of the printer 200 (S 140) by reading the terminal (PWR_STATUS), and re-determines the power supply state of the printer 200 before stopping the power supply to the printer 200.

Accordingly, if the power supply state of the printer 200 is determined as the "power-off" state by operation S 140, there is an error in the operation of the printer 200. On the other hand, if the power supply state of the printer 200 is determined as the "power-on" state, the controller 217 transmits the control signal to the terminal (PWR OFF), to stop the power supply to the printer 200.

The operation S 120, in which the controller 217 inputs the 'HIGH' signal into the terminal (PWR OFF) to turn the printer 200 off, is identical to the operation as described above, and accordingly a description at this point is omitted.

Meanwhile, if the power for the host 100 is turned off, the host 100 transmits a power-off command to the controller 217 of the printer 200 through the data wire of the interface (S 150). The controller 217 inputs the 'HIGH' signal into the terminal (PWR OFF) of the second side of the power supply portion 230, such that the printer 200 is turned off. After that, the operation to turn the printer 200 off continues in the same way as described above (S 120).

Since the voltage of +5V is stopped from being supplied from the VBUS line to the logic portion 210 of the printer 200 when the host 100 is turned off. Also, the controller 217 transmits the control signal to the terminal (PWR OFF) of the second side of the power supply portion 230 to stop the power supply to the printer 200 (S 150). As described above, the operation of the switch portion 230 is stopped by the control signal such that the printer is turned off (S 120). Accordingly, when the printer 200 does not perform the printing operation, the power is not applied to the printer 200.

As described above, the voltage of +5V, which is supplied from the host 100 through the VBUS line, is used as the drive voltage to drive the logic portion 210 such that the logic operation of the printer 200 is controlled when the printer 200 is in the off-state. Accordingly, the power supply to the printer 200 is controlled according to the transmission of the printing data from the host 100.

According to the present invention, since the printer 200 is capable of remote control of the power state via the host 100, the printer 200 is set in a power on/off state according to the transmission of the printing data from the host 100. This differs from the conventional design, in which a user controls the state through the input portion.

Therefore, the present invention reduces unnecessary power consumption, and is also more convenient for the user.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An electronic apparatus connected to a host, the electronic apparatus comprising:
   an interface to connect the electronic apparatus to the host, the interface comprising:
   a data wire through which data is transmitted from the host, and
   a power supply wire through which a voltage is applied to the apparatus from the host;
   a power supply portion to convert an external power to a driving power and to selectively supply the driving power to the respective electronic components of the electronic apparatus;
   a switch portion to determine whether to supply the driving power to the respective electronic components; and
   a controller capable of operating by the voltage applied from the host through the power supply wire, and to control the switch portion according to the data transmitted from the host through the data wire.

2. The apparatus of claim 1, wherein the switch portion is disposed inside the power supply portion.

3. The apparatus of claim 1, wherein the controller controls the switch portion to stop a supply of the driving power to the respective electronic components when the data is not transmitted from the host for a predetermined time.

4. The apparatus of claim 1, wherein the controller controls the switch portion to stop a supply of the driving power to the respective electronic components when the voltage is not applied through the power supply wire from the host.

5. A printer connected to a host via an interface having a data wire through which printing data is transmitted from the host, and a power supply wire through which a voltage is applied from the host, the printer comprising:
   a power supply portion to convert an external power to a driving power and to supply the driving power to the respective electronic components of the printer;
   a switch portion to determine whether to supply the driving power to the respective electronic components; and
   a controller capable of operating by the voltage applied from the host through the power supply wire, to control the switch portion according to the printing data transmitted from the host through the data wire.

6. The printer of claim 5, wherein the switch portion is disposed inside the power supply portion.

7. The printer of claim 5, wherein the controller controls the switch portion to stop a supply of the driving power to the respective electronic components when the printing data is not transmitted from the host for a predetermined time.

8. The printer of claim 5, wherein the controller controls the switch portion to stop a supply of the driving power to the respective electronic components when the respective components are not operated for a predetermined time.

9. The printer of claim 5, wherein the controller controls the switch portion to stop a supply of the driving power to the respective electronic components when the voltage is not applied from the host through the power supply wire.

10. The printer of claim 5, wherein the controller controls the switch portion to stop a supply of the driving power to the respective electronic components when a power stop command is transmitted from the host through the data wire.

* * * * *